United States Patent [19]

Mansikkamaki et al.

[11] Patent Number: 5,679,407
[45] Date of Patent: Oct. 21, 1997

[54] METHOD FOR THE HARDENING OF WOOD MATERIAL

[75] Inventors: Paavo Mansikkamaki, Äänekoski; Markku Paakki, Lapeenranta, both of Finland

[73] Assignee: Finnforest Oy, Finland

[21] Appl. No.: 478,886

[22] Filed: Jun. 7, 1995

Related U.S. Application Data

[63] Continuation of Ser. No. 246,106, May 19, 1994, abandoned.

[30] Foreign Application Priority Data

May 28, 1993 [FI] Finland ................. 932460

[51] Int. Cl.⁶ ................................................. B05D 3/00
[52] U.S. Cl. ................. 427/297; 427/354; 427/393; 427/440; 427/443; 427/325
[58] Field of Search ............................. 427/297, 353, 427/354, 393, 440, 443, 325; 144/380

[56] References Cited

U.S. PATENT DOCUMENTS

| | | | |
|---|---|---|---|
| 2,867,543 | 1/1959 | Braun, Jr. | 427/46 |
| 4,205,097 | 5/1980 | Arledter et al. | 427/44 |
| 4,883,719 | 11/1989 | Brebner | 428/541 |
| 5,169,687 | 12/1992 | Sunol | 427/297 |
| 5,343,913 | 9/1994 | Tanahashi et al. | 144/380 |

FOREIGN PATENT DOCUMENTS

| | | |
|---|---|---|
| 0373726 | 12/1989 | European Pat. Off. |
| 44945 | 1/1971 | Finland. |
| 44946 | 1/1971 | Finland. |
| 813936 | 6/1982 | Finland. |
| 1792051 | 9/1978 | Germany. |
| 7409593 | 12/1978 | Sweden. |

OTHER PUBLICATIONS

Official Action issued in the Priority Finnish Application S.N. 932,460 W/ English Translation.

*Primary Examiner*—Shrive Beck
*Assistant Examiner*—Brian K. Talbot
*Attorney, Agent, or Firm*—Vickers, Daniels & Young

[57] ABSTRACT

The invention relates to a method for the hardening of wood material by impregnating it with a polymerizable substance and by polymerizing the polymerizable substance by means of heat. Heat transfer and cleaning in the polymerization have been improved through the impregnated wood material being in contact with water during the polymerization. The water is preferably hot and pressurized and serves at the beginning of the polymerization as a heating medium and during the polymerization as a cooling and cleaning medium.

29 Claims, No Drawings

METHOD FOR THE HARDENING OF WOOD MATERIAL

This is a continuation of application Ser. No. 246,106 filed May 19, 1994 now abandoned.

The invention relates to a method for hardening wood material by impregnating it with a polymerizable substance and by polymerizing the polymerizable substance by means of heat.

The technological use of a number of species of timber is limited by their inherent softness. The softness of wood, as well as its other mechanical strength properties, is derived from the microstructure of the wood, which is different in different species of timber. All species of timber are composed mainly of hollow cells parallel to the direction of the trunk, i.e. of wood fibers, of which both the size and the structure vary. Roughly it can be said that the larger the cell lumens in proportion to the cell size, the softer and weaker the wood.

Without dealing in greater detail with the formation of the inherent properties of wood it can, however, be stated that the growth of the cell tissue is affected by, for example, the hereditary factors of the wood, the water and nutritional situation in the soil, and the climate during the growth period. A major proportion of the wood available globally consists of these so-called soft species of timber, and in most cases they have only lower-value use. This is, of course, seen in the commercial uses and prices of species of timber.

Uses in which especially the hardness of wood is important include various surface materials in buildings, such as floor and table surfaces. Among the Finnish species of timber, only the birch competes in terms of its hardness on a par with foreign species, such as oak, beech, elm, etc.

The hardness of wood can best be affected by filling the empty spaces in the cell tissue with a solid. The filling can be done by impregnating the wood in a closed space with a liquid which can be hardened inside the wood, for example by polymerization. One problem is how to cause the liquid to penetrate evenly into the cell tissue of the wood, since the permeability of most species of timber is poor and may vary significantly in various parts of the timber. For this reason, poorly impregnable wood is treated with an impregnation liquid in a closed space by using vacuum and/or pressure. Another problem is to cause the impregnating substances to polymerize inside the wood so that the wood is not burned or split, or does not lose properties important for its technological uses, such as its capability of being sanded, machined, glued or its surface being treated.

Substances intended for the impregnation of wood are often polymerized by using heat. The reaction is exothermal and usually causes in wood materials and wood-based materials harmful splitting, changes in the dimensions, and also burning. The temperature within the wood rises to a very high level owing to the reaction. In known methods, attempts have been made to prevent this by polymerizing the pieces between hot thermal plates, as in FI Patent 44946. The thermal plates serve to initiate the reaction and also to even out the heat of reaction and cool the reaction. However, the method is space consuming and costly.

Another method of controlling the polymerization reactions is to use radiation to initiate the polymerization. Pieces of wood material are in this case treated, for example, by gamma radiation. The use of the method on an industrial scale is expensive, and its implementation for sheet-like pieces of wood requires a larger apparatus configuration, thus increasing for example occupational safety risks.

From FI Patent 44945 there is known a method for producing wood which contains a synthetic polymer by means of a catalyst and heat, in which method the polymerization reaction is retarded by using conjugated unsaturated fatty acids, terpenes which contain three double bonds, or derivatives of these. The use of retarders such as these has the disadvantage that they may react in different ways in different wood materials.

Methods have also been used in which pieces are heated by using flowing gases and water vapor to initiate the reaction, and the same substances are used for cooling the overheating of the reaction. Cf. FI Patent 50070. However, in methods employing gas there occurs detrimental evaporation of chemicals, thus producing pieces which are hardened more unevenly. In addition, expensive gas recovery systems have to be resorted to, which increases the complexity and cost of the process. When water vapor is used, there are often produced precipitate and hardenings of polymerized plastic on the walls of the process vessels and burrs at the ends and on the sides of the pieces; with time these cause cleaning problems, operational disturbances, and problems of machining and detaching. The dimensions of the test pieces change and the incurred loss of raw material becomes relatively high.

Methods have also been used in which impregnated pieces are treated with heat transfer mediums. DE Lay-Open Print 1 792 051 discloses the use of glycol as a heat transfer medium. SE Lay-Open Print 405329 discloses the use of polyethylene glycol as a heat transfer medium. In test pieces such methods result in problems associated with aftertreatment, for example surface treatment. Residues of glycol and polyethylene glycol, for example, prevent the adhering of lacquer on the surface of the product. Emulsions, for their part, conduct heat poorly, which results in unevenly hardened pieces and overheating. Heating causes splitting of the pieces, and dimensional changes and burning. Process control is also complicated by the uneven hardening of the chemical, in which case the produced precipitates and other such impurities will hamper the operation of the process apparatus, and the burrs from the slow process will complicate the further treatment of the pieces.

The object of the present invention is to provide a simple, environment-friendly, occupationally safe, and inexpensive method for the hardening of wood material by impregnating it with a polymerizable substance and by polymerizing the polymerizable substance by means of heat. The method according to the invention is thus mainly characterized in that the polymerizable substance is polymerized while the wood material is in contact with water. It has thus been realized that water is an excellent medium when heating an impregnated wood material to the polymerization temperature and when cooling an exothermal polymerization reaction during polymerization.

In the method according to the invention, the wood material is first impregnated with a polymerizable substance. The wood material used may be any wood material, but hardening is most useful with soft species of timber, such as coniferous species. The impregnation is by any known impregnation method, for example by forcing a liquid polymerizable substance into the wood cell tissue by elevated pressure or by impregnating the cell tissue with it by means of a vacuum. Overpressure and vacuum can also be combined in a suitable manner to achieve impregnation.

When a wood material has been impregnated with a polymerizable substance, the impregnated wood material is contacted with water before the polymerization. The impregnated wood material is preferably immersed in hot water. According to one embodiment, the temperature of the water is approx. 40°–200° C., most preferably approx.

80°–150° C. It is also advantageous if the water and the impregnated wood material immersed in it are maintained at an overpressure. In this case the overpressure is used for preventing the water from boiling and for preventing the polymerizable substance from evacuating from the wood material. The said overpressure preferably exceeds the vapor pressure at the temperature of the water and is in that case at minimum approx. 3 bar.

The polymerization temperature can be adjusted by heating or cooling the water in which the impregnated wood material is immersed. The water in which the impregnated wood material is immersed can be circulated in a substantially closed system in order to carry out heat exchange, cleaning operations, etc. The polymerization is preferably carried out in an inert gas, such as nitrogen gas, the nitrogen gas preventing the oxygen of air from interfering with the polymerization reaction. It is thus advisable to use nitrogen gas already at the impregnation stage.

After the impregnation and before the polymerization it is advantageous to rinse the impregnated wood material, and preferably the whole process apparatus, with cold water. Cold water will rinse off excess chemicals from the surfaces of the pieces and will protect the process apparatus so that the actuating devices and pipes are not clogged with polymerizing substances.

Polymerization can be initiated by feeding the water, which is hot and preferably pressurized, into the midst of the impregnated wood material. The water being pressurized, of course, requires that the polymerization is carried out in a pressure vessel and that an inert gas such as nitrogen has first been directed into the vessel to generate overpressure. In this manner the impregnated wood material, in part or wholly immersed in water, is heated in an inert atmosphere to a temperature at which polymerization starts.

As known, the polymerization reaction is highly exothermal and may cause overheating which will destroy both the wood material and the forming polymer. Overheating caused by the polymerization reaction can be prevented preferably by cooling the water in which the impregnated wood material is immersed. It is, of course, advantageous to use effective mixing and/or circulation via heat exchangers. It is also preferable to circulate the hot water, pressurized, via filters for a sufficiently long time to complete the polymerization. The pressure of the inert gas, such as nitrogen, must be adjusted so that the water will not boil at the temperature concerned.

When the polymerization has been brought to completion, the hot water and possibly the pressure are removed and the wood material product is rinsed preferably with cold water. By means of such rinsing, any plastic precipitates formed and other impurities are removed from the surfaces of both the wood material and the polymerization apparatus. The actuating devices return to their correct dimensions, and polymerization which would cause clogging will no longer occur in them. One important advantage of the invention is indeed that it is possible to use the same inexpensive liquid both for the wash and for the heat transfer during the reaction.

The advantages of the water cycling system mentioned above include that only an amount of water equal to that leaving in steam, precipitate and the product is fed into the process. The process is thus a substantially closed impregnation and hardening process. The formed plastic precipitate and impurities are removed by filtering and they can be burned together with, for example, saw dust and bark. Any chemical residues produced in the cold water cycle are decanted from the water and are recycled. The residues in the hot-water vessel can be reduced by adding into the hot water, for example overnight, a catalytic agent to precipitate the plastic on the bottom of the vessel, from which it is filtered and transferred for burning.

In the method according to the invention the wood material can be impregnated with the polymerizable substance as such or in the form of a solution, dispersion or other mixture. What is most important is that the polymerizable substance is absorbed into the cell tissue of the wood material. According to one embodiment, an agent which regulates the viscosity of the polymerizable substance is mixed with it.

The polymerizable substance may in principle be any material which will polymerize or become bridged into a final polymer product in the midst of the wood material. It may be a monomer, a prepolymer, or a mixture of a prepolymer and a monomer.

As examples of monomers should be mentioned acrylic monomers such as acrylic esters, methacrylic esters, acrylonitriles, and acrylamides; styrene monomers such as styrene, α-methyl styrene and divinyl benzene; vinyl and vinylidene monomers such as vinyl halides, vinylidene halides, vinyl ethers and vinyl esters; aldehyde monomers such as formaldehyde and acetaldehyde, cyclic ether oxides such as ethylene oxide and propylene oxide; cyclic lactames and lactones.

Thermosetting polymerizable substances are in general prepolymers. They include phenol, urea, and melamine formaldehyde products, polyurethanes, epoxides, silicones, and unsaturated polyesters.

Some preferred ethylenically unsaturated monomers to be mentioned are the acrylic, styrene and vinyl polymers mentioned above. Prepolymers include the prepolymer of an unsaturated polyester, actually a hardenable mixture of a polyester prepolymer and a styrene or acrylic monomer.

When it is desired to harden wood materials by polymerizing a substance with which they have been impregnated, it is preferable to add a bridging reagent to the polymerizable substance. This bridging reagent may be an ordinary monomer, which forms a chain between prepolymers, or a multifunction monomer which, acting as a mer, reacts further and links polymer chains to each other.

As mentioned above, the polymerization is preferably carried out in the presence of a catalyst. When unsaturated monomers and/or prepolymers are used, the catalyst is a so-called initiator, such as a radical initiator, an anionic initiator or a cationic initiator. The most important of these initiators is the radical initiator. Some typical radical initiators are peroxides, such as diacyl peroxides, acetyl-alkyl-sulfonyl peroxides, dialkyl peroxydicarbonates, tert-alkyl peroxyesters, OO-tert-alkyl-O-alkyl monomer peroxydicarbonates, di-(tert-alkyl-peroxy)ketals, di-tert-alkyl peroxides, tert-alkyl hydroxides, ketone peroxides, and silyl peroxides. The peroxides, which in polymerization decompose into initiating radicals, are listed above according to their decreasing decomposition tendency. Typical peroxides are di-n-propyl peroxydicarbonate, dilayroyl peroxide, diacetyl peroxide, dibenzoyl peroxide, dicumyl peroxide, and di-tert-butyl peroxide.

Other radical initiators include azo-type initiators, such as 2,2'-azobis-[2,4-dimethyl]pentanenitrile, 2,2'-azobis-isobutyronitrile, and 1-(tert-amylazo) cyclohexanecarbonitrile.

In the present invention it is also possible to use so-called photoinitiators, which under the effect of light decompose into radicals which initiate polymerization.

The present invention may also be combined with state-of-the-art methods so that the use of water as the heat transfer medium is combined, for example, with the use of cooling surfaces according to FI Patent 44946 or retarders according to FI Patent 44945. Such combining can be done by an expert in the art, when necessary.

Owing to the present invention, pieces of wood will retain their shape well, the hardness will be considerably more even, species of timber previously difficult to impregnate can be converted to products with a higher degree of processing, separate after-machining will not be needed for removing various detaching agents or additives, very little or no evaporation of chemicals will occur in the process, the apparatus will not require a great deal of space, and the apparatus will not be expensive. As a closed system the process will be occupationally safe and the produced waste can be destroyed in a controlled manner by burning.

An embodiment example is given below, the sole purpose of the example being to illustrate the present invention.

EXAMPLE

Veneers 1230 mm long, 1.0-5 mm thick and approx. 165 mm wide, packed into a package with an intermediate medium, are impregnated, by using vacuum and pressure, with a chemical mixture which contains approx. 90 % methyl methacrylate, approx. 9.5 % a bridging chemical, for example butyl acrylate or trimethylolpropane triacrylate, and as the catalyst 0.5 % benzoyl peroxide or azobisisobutyronitrile.

After impregnation, any excess impregnation solution having left the cylinder, cold water at approx. 5° C. is fed into it, which rinses any loose chemical from the veneer surfaces and produces in the process apparatus a so-called cold shielding bed to prevent polymerization in the pipes and the actuating devices. MMA is lighter than water, and so it can be removed by rinsing and be separated from the water by decanting in a separate vessel.

After the cold rinsing, a nitrogen overpressure of approx. 3-5 bar (overpressure) is fed into the impregnation-hardening cylinder and simultaneously the water to be used for the polymerization is heated, pressurized, to a sufficient temperature, i.e. approx. 100-130° C., whereafter the hot water is fed into the impregnation-hardening cylinder. When the cylinder has been filled, the pressure is raised in the hot container and the cylinder to approx. 5 bar.

Thereafter, polymerization is initiated with the pressurized hot water. The polymerization time is dependent on the timber species, the achieved chemical impregnation, the heating temperature, and the heating time. The heating time is approx. 30-40 min. Any plastic precipitate formed during the heating is directed within the cycle to filters, from which it can be removed and directed to burning.

After the heating stage, the cylinder is emptied and cold water is fed into it for rinsing and for evening out the thermal expansion of the actuating devices, and as a shield for the actuating devices in order to conduct the heat to the chemicals to decrease the risk of polymerization.

After the cold rinsing the veneers are unloaded from the cylinder. The unloaded veneers contain loose water approx. 20-30 %, which is removed by drying either by means of a roller dryer or a press drier. After the drying, the veneers are ready for use as surfacing for various products.

When the hardening activity has been interrupted, for example overnight, a catalyst can be fed into the hot-water tank in order to improve the precipitation of the chemicals. The MMA content in the water in the cold-water tank will rise by 1.5 %, whereafter no more MMA will dissolve in the water. Being lighter than water it will rise to the surface in the tank, from where it will be recovered by decanting and be recycled.

As a final result of our process, hardness values have been obtained which are as follows as compared with normal wood: Pine normal Brinell hardness 1.6 N/mm$^2$ and with hot water hardening approx. 6-11 N/mm$^2$, varying with respect to the heartwood; beech normal Brinell hardness is approx. 2.4 N/mm$^2$ and hardness after treatment 8-12 N/mm$^2$; birch normal Brinell approx. 2.3 N/mm$^2$ and hardness after treatment 12-14 N/mm$^2$; and aspen normal hardness 1.2 N/mm$^2$ and hardness after treatment 12-16 N/mm$^2$. In most cases the inherent hardness of wood increases approximately 5-10 fold. Scatter is caused by non-homogeneity and poor permeability to liquids.

We claim:

1. A method for the hardening of wood material by impregnating said wood with a polymerizable solution and thereafter by polymerizing said polymerizable solution by means of heat, said polymerizing step comprising providing hot water, said water having a temperature between 40°-200° C., immersing said impregnated wood material in said water, maintaining said water at a pressure at an effective an amount above atmospheric pressure for impregnating said wood with said water for polymerizing said polymerizable solution while said impregnated wood material is immersed in said water.

2. A method according to claim 1, wherein said water has a temperature and said pressure above atmospheric pressure exceeds the vapor pressure of water at said temperature concerned and is a minimum of 3 bars.

3. A method according to claim 1, wherein said polymerizing step occurs at a polymerization temperature, said method further comprising immersing said impregnated wood material in said water and regulating said polymerization temperature by heating or cooling said water.

4. A method according to claim 1, further comprising immersing said impregnated material in said water and circulating said water in a substantially closed cycle for the carrying out of heat exchange or cleaning operations.

5. A method according to claim 1, further comprising carrying out said polymerizing step in an inert gas.

6. A method according to claim 1, said method further comprising rinsing said impregnated wood material with cold water between said impregnating step and said polymerizing step.

7. A method according to claim 1, further comprising initiating said polymerizing step by feeding said water, said water being hot and preferably pressurized, into said impregnated wood material.

8. A method according to claim 1, further comprising immersing said impregnated wood material in said water and cooling said water for preventing overheating caused by said polymerizing step.

9. A method according to claim 1, further comprising removing said hot water after said polymerizing step, and rinsing said wood material product with cold water.

10. A method according to claim 1, further comprising providing a viscosity controlling agent and mixing said viscosity controlling agent with said polymerizable substance.

11. A method according to claim 1, further comprising using an organic substance which constitutes a phase separate from the water as said polymerizable substance.

12. A method according to claim 1, further comprising using a material which will polymerize into a final polymer product within said wood material such as a monomer, a prepolymer or a mixture of said monomer and said prepolymer, and a polymerization catalyst as said polymerizable solution for carrying out said polymerizing step.

13. A method according to claim 1, wherein said water temperature is preferably between 80°–150° C.

14. A method according to claim 7, wherein said inert gas is nitrogen gas.

15. A method for the hardening of a wood material, said method comprising inpregnating said wood with a polymerizable solution, providing water at a minimum pressure of 3 bars for immersing and impregnating said impregnated wood material with said water, polymerizing said polymerizable said polymerizable solution, said polymerizing step comprising heating said water and feeding said water into said impregnated wood material at said minimum pressure, cooling said polymerization reaction by cooling said water in which said wood material is immersed, removing said heated water and rinsing said wood material with cold water.

16. The method of claim 15, further including rinsing said wood material following said impregnating step.

17. The method of claim 15, further including circulating said water in a closed system for heat exchange.

18. The method of claim 15, wherein said hot water has a temperature and heating said hot water to a temperature between 80°–150° C.

19. The method of claim 15 wherein said hot water has a temperature and heating said hot water to a temperature between 100°–130° C.

20. The method of claim 19, wherein said heating step is prior to said feeding step.

21. A method for hardening of wood material in two steps, the first step being impregnating said wood with a polymerizable solution, the second step being polymerizing said polymerizable solution with heat, said polymerizing step comprising providing water, heating said water, immersing said impregnated wood material in said water, maintaining said water at a pressure at an effective amount above atmospheric pressure for impregnating said wood with said water and carrying out said polymerizing step by polymerizing said polymerizable solution within said water and impregnating said wood with said water with said pressure while said impregnated wood material is immersed in said water.

22. The method of claim 21, wherein said hot water has a temperature between 40° and 200° C.

23. The method of claim 22, wherein said temperature is above 105° C.

24. The method of claim 23, including maintaining said pressure at a level to prevent boiling of said water.

25. The method of claim 21, wherein said hot water has a temperature above 100° C.

26. The method of claim 25, including maintaining said pressure at a level to prevent boiling of said water.

27. A method for the hardening of a wood material, said comprising impregnating said wood with a polymerizable solution, providing water at a minimum of 3 bars for impregnating said wood with said water, and polymerizing said polymerizable solution, said polymerizing step comprising heating said water above 100° C. without boiling said water and impregnating water into said impregnated wood material by said minimum pressure of 3 bars, cooling said polymerization reaction by cooling said water in which said wood material is immersed, removing said heated water and rinsing said wood material with cold water.

28. The method of claim 27, wherein said water is heated above 105° C.

29. A method for hardening of wood material is comprising providing a pressure vessel, impregnating said wood with a polymerizable solution in said vessel and without removing said wood from said vessel, polymerizing said polymerizable solution by means of heat, said polymerizing step comprising providing water, heating said water, immersing said impregnated wood material in said water, maintaining said water at a pressure at an effective amount above atmospheric pressure for impregnating said wood with said water for polymerizing said polymerizing solution while said impregnated wood material is immersed in said water.

* * * * *